United States Patent [19]

Bramblett et al.

[11] Patent Number: 4,647,420
[45] Date of Patent: Mar. 3, 1987

[54] NUCLEAR FUEL PIN SCANNER

[75] Inventors: Richard L. Bramblett, Friendswood, Tex.; Charles A. Preskitt, La Jolla, Calif.

[73] Assignee: The United States of America as represented by the Department of Energy, Washington, D.C.

[21] Appl. No.: 713,165

[22] Filed: Mar. 18, 1985

[51] Int. Cl.⁴ .............................................. G21C 17/00
[52] U.S. Cl. .................................. 376/159; 376/257; 376/341; 376/342
[58] Field of Search ............... 376/153, 159, 257, 341, 376/342

[56] References Cited

U.S. PATENT DOCUMENTS

| | | | |
|---|---|---|---|
| 3,018,374 | 1/1962 | Pritchett | 376/159 |
| 3,222,251 | 12/1965 | Einfeld | 376/159 |
| 3,436,538 | 4/1969 | Basdekas | 376/159 |
| 3,456,113 | 7/1969 | Keepin | 376/159 |
| 3,496,357 | 2/1970 | Weinzierl et al. | 376/159 |
| 4,229,654 | 10/1980 | Arya et al. | 376/159 |
| 4,497,768 | 2/1985 | Caldwell et al. | 376/153 |

FOREIGN PATENT DOCUMENTS

1407115  6/1965  France ................. 376/341

Primary Examiner—Salvatore Cangialosi
Attorney, Agent, or Firm—Edward W. Nypaver; Robert Southworth, III; Judson R. Hightower

[57] ABSTRACT

Systems and methods for inspection of nuclear fuel pins to determine fissile loading and uniformity. The system includes infeed mechanisms which stockpile, identify and install nuclear fuel pins into an irradiator. The irradiator provides extended activation times using an approximately cylindrical arrangement of numerous fuel pins. The fuel pins can be arranged in a magazine which is rotated about a longitudinal axis of rotation. A source of activating radiation is positioned equidistant from the fuel pins along the longitudinal axis of rotation. The source of activating radiation is preferably oscillated along the axis to uniformly activate the fuel pins. A detector is provided downstream of the irradiator. The detector uses a plurality of detector elements arranged in an axial array. Each detector element inspects a segment of the fuel pin. The activated fuel pin being inspected in the detector is oscillated repeatedly over a distance equal to the spacing between adjacent detector elements, thereby multiplying the effective time available for detecting radiation emissions from the activated fuel pin.

14 Claims, 11 Drawing Figures

FIG 7

NUCLEAR FUEL PIN SCANNER

TECHNICAL FIELD

The technical field of this invention is scanners for inspecting nuclear fuel pins. The United States Government has rights in this invention pursuant to Contract No. Y6E-S44-36837 between the U.S. Department of Energy and the IRT Corporation.

BACKGROUND OF THE INVENTION

Nuclear fission reactors use fuel pins which are loaded with pellets of fissionable nuclear fuel. The amount and concentration of fissionable or fissile material contained within the fuel pin is an important parameter for proper operation and maintenance of a nuclear reactor. Assurance of high quality and adherence to design specifications can advantageously be accomplished by inspecting fuel pins for uniformity and total content of the fissile material. It may also be desirable in certain cases to perform other types of inspections.

Fuel pin scanners are currently being used to inspect nuclear fuel pins to assure proper uniformity and amount of fissile material. Current technologies do not, however, provide the production speed or level of accuracy which is now required in producing fuel pins used in liquid metal fast breeder reactors. Plutonium recycle systems used in light water reactors also have similar expected need for high production capability and accuracy in inspecting fuel pins.

Fuel pin scanners are already in use in light water reactor fuel manufacturing plants. The early fuel pin scanners used passive systems which simply measured the natural radioactivity of the fuels. Such systems were very slow, thereby requiring large numbers of scanners just to inspect the output of a large light water reactor fuel plant.

The economical availability of californium-252 led to the development of nuclear fuel pin scanners which activate the fissile material using radiation. Such fuel pin scanners were capable of processing up to approximately 1,000 uranium oxide fuel pins per day. Such prior pin scanners used a single pass configuration which was relatively slow and provided limited accuracy.

The need for fabricating plutonium bearing nuclear fuels on a large scale arose with the liquid metal fast breeder reactor program. Scanning of plutonium bearing fuel pins used in such reactors has created special requirements which were not satisfactorily met by the prior art. Most significant of the problems was the need for greater accuracy in measuring the uniformity of fissionable material contained within the fuel pin. Liquid metal fast breeder reactor fuel pin scanners must not only detect rejectable defects but must also allow characterization of the fuel for identification purposes. Characterization of the fuel allows for the fuel to be more closely monitored during the manufacturing process. This in turn aids in the production of high quality and safe, fast reactor fuels.

The typical prior art light water reactor fuel pin scanner consisted of: (1) an irradiator containing one to five milligrams of californium-252; (2) mechanisms for transporting fuel pins sequentially through the irradiator and through one or two fission product gamma ray detectors; (3) sodium iodide, bismuth germanate or plastic scintillators; (4) a gamma ray transmission device for measuring gaps and nuclear fuel density; and (5) an on-line computer for collection and processing of data.

All prior art light water reactor fuel pin scanners measured fissile uniformity in a single pass of the fuel pin through the irradiator and detector. In this single pass configuration the fuel pins were passed near a irradiator containing a neutron source such as californium-252 which activates the fissile material to provide increased radioactive emissions therefrom. The activated fuel pin was then passed through a detector in a single pass. Such single pass systems were relatively slow because of the exposure time needed to sufficiently activate the fuel pin and the length over which activation occurred. Decreasing the exposure time to increase capacity required increasing the irradiation power which was not economical. Higher capacity could also be achieved through increased numbers of systems but this also was expensive and indicated the need for high capacity systems which addressed the problem in a new manner.

Such single pass activation and detection was also found impractical to achieve the increased accuracy necessary in producing fuel pins used in liquid metal fast breeder reactors. Liquid metal fast breeder reactors use nuclear fuel made with mixed oxides of plutonium and uranium, rather than the uranium dioxide fuels commonly used in light water reactors. Fuel pins made with mixed oxides of plutonium and uranium are more difficult to measure for fissile uniformity because the fissile loading of the fuel pellets is much greater and the thermal neutron activation commonly used with uranium dioxide fuel pins is not effective as an activating source of radiation.

Applying known light water reactor fuel pin scanner technology to fuel pins loaded with mixed oxides of plutonium and uranium requires using relatively large amounts (0.1 gram) of californium-252, as compared to 1-5 millgrams used in current light water reactor fuel pin scanners. This amount of californium-252, has a value in excess of $1,000,000 thereby rendering current fuel pin scanner technology uneconomical for fuel pins used in liquid metal fast breeder reactors.

SUMMARY OF THE INVENTION

It is an object of this invention to provide a nuclear fuel pin scanner which is capable of high production capacity.

It is another object of the invention to provide a nuclear fuel pin scanner which accurately and reliably measures fissile uniformity and total fissile loading.

It is a further object of this invention to provide a nuclear fuel pin scanner which provides extended irradiation times while maintaining a high production throughput.

And it is a still further object of this invention to provide a nuclear fuel pin scanner having improved detector accuracy.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the nuclear fuel pin scanning system of this invention may comprise a rotary irradiator having a source of activating radiation located centrally thereof. A plurality of spaced positions are provided for supporting a plurality of fuel pins in an arrangement wherein the fuel pins are equally spaced from the source of radiation. The source of radiation advantageously lies along the rotational axis of the irradiator and the fuel pins are slowly rotated thereabout. Means are provided for feeding and discharging the fuel pins to and from their positions in the irradiator. Means are also advantageously provided for axially oscillating the source of activating radiation relative to the fuel pins being activated in the irradiator. Further means are provided for indexing or otherwise rotating the irradiator to advance the fuel pins through a range of positions about the source of radiation. The simultaneous irradiation of a plurality of fuel pins allows for extended activation times when compared to single pass systems and the required throughput rate of the entire system.

The nuclear fuel pin scanning system of this invention also includes a detector having a plurality of detector elements arranged in an axial or linear array which receives a fuel pin therein. The detector elements advantageously include a collimating shield defining an annular opening which allows radiation emitted from the activated fuel pins to strike radiation transducers. The radiation transducers can advantageously be a crystal which illuminates when struck by the radiation being detected. The crystal is optically coupled to a photomultiplier or other light transducer which produces an electronic signal representative of the level of radiation striking the crystal.

The plurality of detector elements arranged in a linear array allows each element to detect a limited segment of each fuel pin. The fuel pin is oscillated repeatedly over the relative short distance equal to the spacing between adjacent detector elements. Repeated passes using multiple detectors covering short distances of the fuel pin allow detection times which are effectively much longer than if the entire length of the fuel pin was passed by a single detector either in a single pass or multiple passes. Accordingly, the production throughput can be maintained at a high rate even though accurate multiple pass detection is being performed. The multiple detector elements further allow specific accurate readings for each segment of the fuel pin.

The invention further comprises a method for inspecting nuclear fuel pins to accurately determine uniformity and total amount of fissile material, while maintaining a relatively high production throughput rate. The method involves arranging a plurality of nuclear fuel pins in an arrangement about a longitudinal axis of rotation with each fuel pin spaced approximately equally from the axis. The arrangement of fuel pins is rotated about the axis of rotation which also is the location of the source of activating radiation. The fuel pins are activated over an extended period of time as the arrangement slowly rotates or is indexed about the source of activating radiation. This form of extended activation provides greater activation and hence improved accuracy in inspecting the fuel pins without decreasing the throughput rate. The source of activating radiation is preferably oscillated back and forth along the longitudinal axis of rotation thereby allowing even irradiation along the length of each fuel pin using a relatively localized source of radiation.

Methods according to this invention can further include detecting radiation emissions such as gamma ray emissions from the activated fuel pins. The fuel pins are preferably positioned within a linear array of detector elements each serving to detect emissions occurring over a limited segment of the fuel pin. The fuel pins are then oscillated repeatedly over a distance approximately equal to the spacing of adjacent detector elements. Detection in this manner provides greater effective detection times for a given throughput rate.

BRIEF DESCRIPTION OF THE DRAWINGS

A preferred and alternate embodiment of this invention is illustrated in the accompanying drawings, in which.

DETAILED DESCRIPTION OF THE PREFERRED EMBODIMENTS

This specification will first describe the basic features of a preferred embodiment and then explore the components individually in greater detail, and in conjunction with the operation of each.

Figures 1, 2:
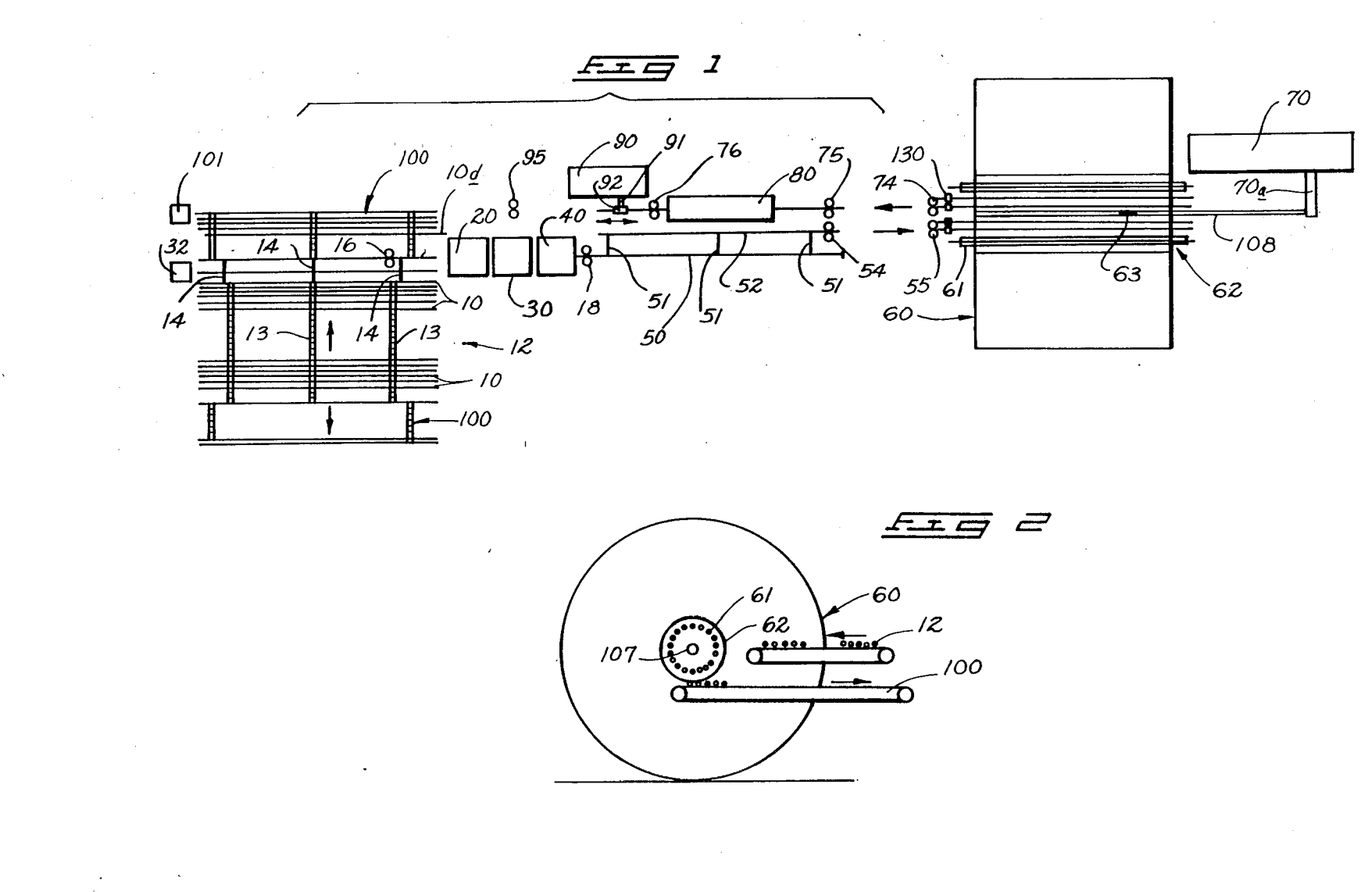
FIG. 1 is a diagrammatic plan view of a preferred embodiment of nuclear fuel pin scanner according to this invention.
FIG. 2 is a schematic end elevational view showing the approximate elevational relationships between the infeed and outfeed means and the general appearance of the irradiator, portions have been removed.

FIG. 1 shows a diagrammatic plan view of the nuclear fuel pin scanner of this invention. Fuel pins 10 are fed into the system via a fuel pin infeed means such as infeed mechanism 12. Infeed mechanism 12 moves a plurality of fuel pins 10 laterally using infeed chains 13, as indicated by the upwardly pointing arrow in FIG. 1 and leftwardly directed arrow in FIG. 2.

Infeed means 12 also includes three shuttles 14 which lift and move the fuel pins laterally in two stages. The first stage of lateral shuttle movement allows pin identifier 32 to read an identification code as the pin is rotated by rollers 25 and 26 (see FIGS. 3 and 4). The pin is then shuttled laterally to a second position to be conveyed onwardly by infeed rollers 16.

Infeed rollers 16 advantageously convey fuel pins 10 through a background detector 20, americium gauge 30, and gamma transmission gauge 40. Alternatively, a belt conveyor or other conveyor means can be used in lieu of rollers 16 to move the pins axially through detector 20, and gauges 30 and 40, and toward irradiator 60.

Background detector 20 measures background radiation existing in the radioactive fuel material prior to activation in irradiator 60 which will be discussed below. The americium gauge 30 provides an indication of the amount of americium contained within the fuel pin. Gamma transmission gauge 40 provides a measure of the transmissibility of gamma rays through the fuel pin. This information is used in the analysis and interpretation of the irradiation and detection steps which occur thereafter, and also helps locate gaps between individual fuel pellets contained within fuel pins 10.

After fuel pins 10 have proceeded through background detector 20, americium gauge 30 and gamma transmission gauge 40, they proceed into position 50 using feed rollers 18 or some other conveyor means. From position 50 fuel pins 10 are transferred laterally by a second shuttle mechanism 51 into position 52. From position 52 fuel pins 10 are conveyed further by pinch rollers 54 and 55. Pinch rollers 55 are retractably mounted so that they do not interfere with rotation of the irradiator magazine 62.

Fuel pins 10 are received within fuel pin receiving tubes 61 in rotating magazine 62 of irradiator 60. The fuel pins 10 held within cylindrical magazine 62 rotate therewith and are exposed to radiation from a source of activating radiation 63 contained within a radiation source tube 108 (see FIG. 5).

The radiation source tube 108 is positioned along the longitudinal and rotational axis of rotatable magazine 62 within an activation passageway 107. Irradiator oscillating means 70 advantageously oscillates the radiation source tube 108 and contained source of radiation 63 back and forth within irradiator 60 to evenly irradiate the fuel pins as the magazine rotates.

Once the fuel pins have rotated about the source sufficiently, they are then removed from the irradiator by retractable pinch rollers 74. Pinch rollers 74 in combination with other conveying means such as rollers 75 and 76 translate the fuel pins into position within the radiation detector 80. Rollers 76 are preferably retractable to allow greater freedom when the fuel pin is oscillated.

Fuel pins 10 extend through detector 80 and are engaged by detector oscillating means 90 which engages the fuel pins with a collet 92 mounted on an oscillatory arm 91. The detector oscillating means 90 oscillates fuel pins back and forth within detector 80 thereby providing multiple pass detection of the radiation emitted by the fissile material contained within the fuel pins. The repeated oscillations are over relatively short distances equal to the spacing of adjacent detector elements. The back and forth oscillation of fuel pins 10 are preferably done at low and constant speeds with a minimum of acceleration when the direction changes. This multiple pass detection over relatively short distances greatly reduces the significance of electronic noise and statistical inaccuracies by allowing the information from the repeated passes to be compiled together on a computer to give a composite which is more accurate than single pass data. The use of a plurality of detector elements in a linear array covering the relevant length of the fuel pin, allows high production throughputs to be maintained despite multiple pass operation because of the relatively short distance over which the fuel pin is oscillated.

After the detection step occurs, the fuel pins proceed onwardly to the fuel pin outfeed 100 via rollers 95. The fuel pin outfeed means includes a fuel pin identifier 101 similar to 32 which reads an identification code on the individual fuel pins. Information from detector 80 is stored in a computerized system and correlated with the correct fuel pin so that rejected fuel pins can be displaced longitudinally such as pin 10d (FIG. 1), and removed mechanically because of the displaced position on the outfeed mechanism 100.

A more detailed discussion of the components of the invention and their operation will now follow.

FIG. 2 shows the fuel pin infeed 12 positioned above and approximately over the fuel pin outfeed 100 and also shows a relative positioning of the infeed and outfeed versus the overall cylindrical shape of the irradiator 60. FIG. 2 is a schematic or diagrammatic view and does not attempt to show detailed features such as the various infeed and outfeed conveying systems necessary for moving fuel pins to and from irradiator 60 and detector 80.

Figure 3:
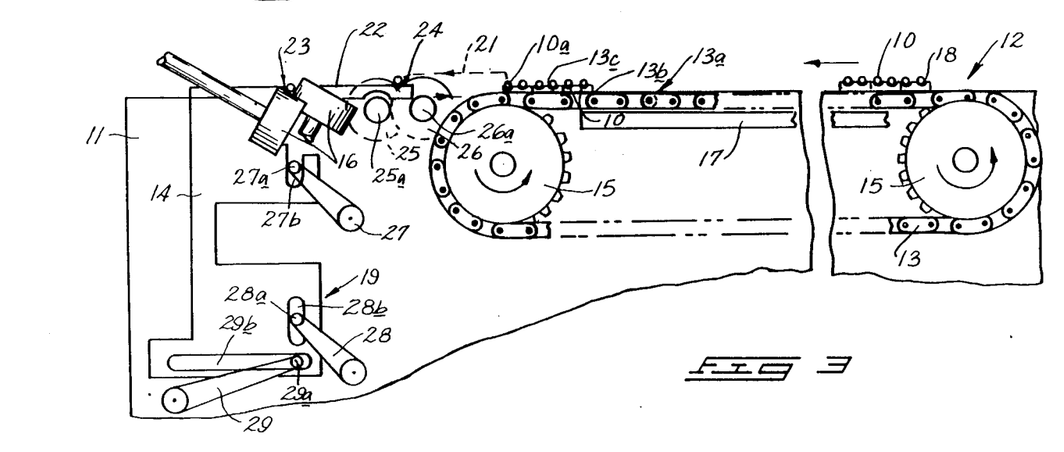
FIG. 3 is an enlarged partial end elevational view of the infeed mechanism incorporated in the scanner of FIG. 1, portions have been removed.
Figure 4:
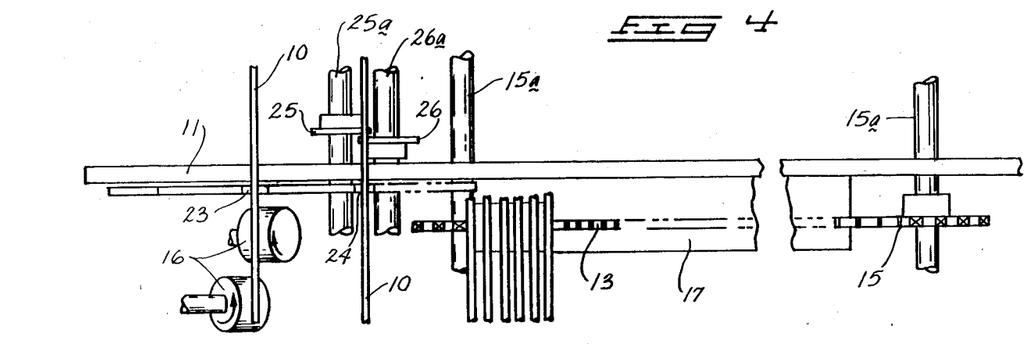
FIG. 4 is a partial plan view of the infeed mechanism shown in FIG. 3.

FIGS. 3 and 4 show partial views of the fuel pin infeed mechanism 12. FIGS. 3 and 4 are also illustrative of the type of mechanism which can be used for fuel pin outfeed 100. The infeed mechanism 12 includes a frame 11. An infeed bank or stockpile is formed by the plurality of infeed chains 13 which are positioned about sprockets 15. Sprockets 15 are rotatably mounted on frame 11. The infeed chains 13 are positioned approximately every two feet along the length of the fuel pins, the exact number being determined by the length of the fuel pins being inspected. Infeed chains 13 preferably are constructed of stainless steel and provided with nylon rollers 13a shown in FIG. 3 at only one point but preferably used at each link pin which can roll along a supporting track 17 positioned beneath the upper run of the infeed chains.

Infeed chains 13 are also preferably provided with fuel pin supporting blocks 13b which can advantageously be constructed of nylon with indentations 13c for receiving individual fuel pins 10 therein. Support blocks 13b positively position the fuel pins to prevent them from contacting each other during lateral motion of the infeeding pins.

Infeed chains 13 are supported and rotated by sprockets 15. Sprockets 15 are connected to adjacent sprockets 15, associated with the other parallel infeed chains 13 using drive shafts 15a. Drive shafts 15a connect parallel infeed chain sprockets 15 so that precisely equal parallel lateral motion of fuel pins 10 is achieved.

Fuel pins being infed are removed from infeed chain 13 by a shuttle 19 having three shuttle heads 14 which each have shuttle arms 22. The number of shuttle heads 14 is determined by the length of the fuel pins. Shuttle heads 14 translate circuitously in a motion shown by dotted lines and arrows 21 in FIG. 3. Notches 23 and 24 in the shuttle arm 22 are properly spaced and positioned so that motion of the shuttle allows notches 24 to pick the left most fuel pin 10a off of the infeed chains, move it upwardly and then onwardly to the left as shown in FIG. 3.

The fuel pins are then positioned on top of two sets of rollers 25 and 26 which spin the fuel pin so that the identification code can be read by infeed identification reader 32. The two sets of rollers 25 and 26 (only one shown) are mounted upon common shafts 25a and 26a.

Shuttle heads 14 then once again go through the cyclical motion, picking up a new fuel pin and transferring the fuel pin held between rollers 25 and 26, via notch 23, to the set of infeed rollers 16. Infeed rollers 16 move the fuel pin longitudinally through background detector 20, americium gauge 30 and gamma transmission gauge 40 and into position 50 shown in FIG. 1.

The shuttle heads 14 are driven through their approximately rectangular path by lever arms 27, 28 and 29 which can advantageously be provided with rollers 27a, 28a, and 29a at their ends. These rollers are held within slots or grooves 27b, 28b, and 29b, respectively. Levers 27, 28, and 29 are pivoted using any suitable mechanism such as solenoids or other kinematic mechanisms which provide the necessary pivotal motions so that the shuttle heads 14 move through the intended path. Such pivotal motion devices are well known in the art of mechanisms.

A shuttle system similar to that shown in detail in FIGS. 3 and 4 is also used to translate the fuel pins from position 50 to position 52 in FIG. 1 and is illustrated in FIG. 1 as shuttles 51.

Figure 5:
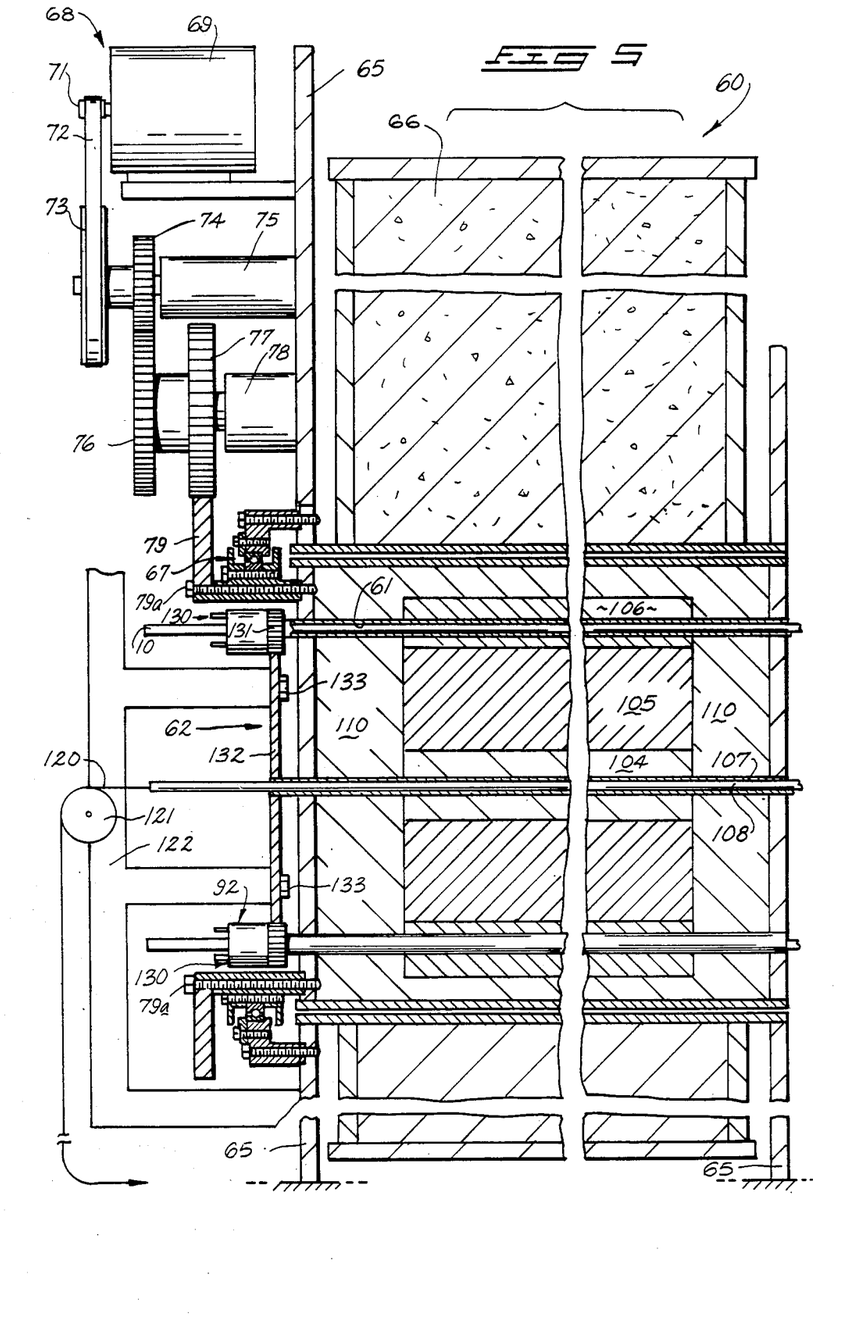
FIG. 5 is a partial side sectional view of an irradiator used in the fuel pin scanner system of FIG. 1, portions have been removed.
Figure 6:
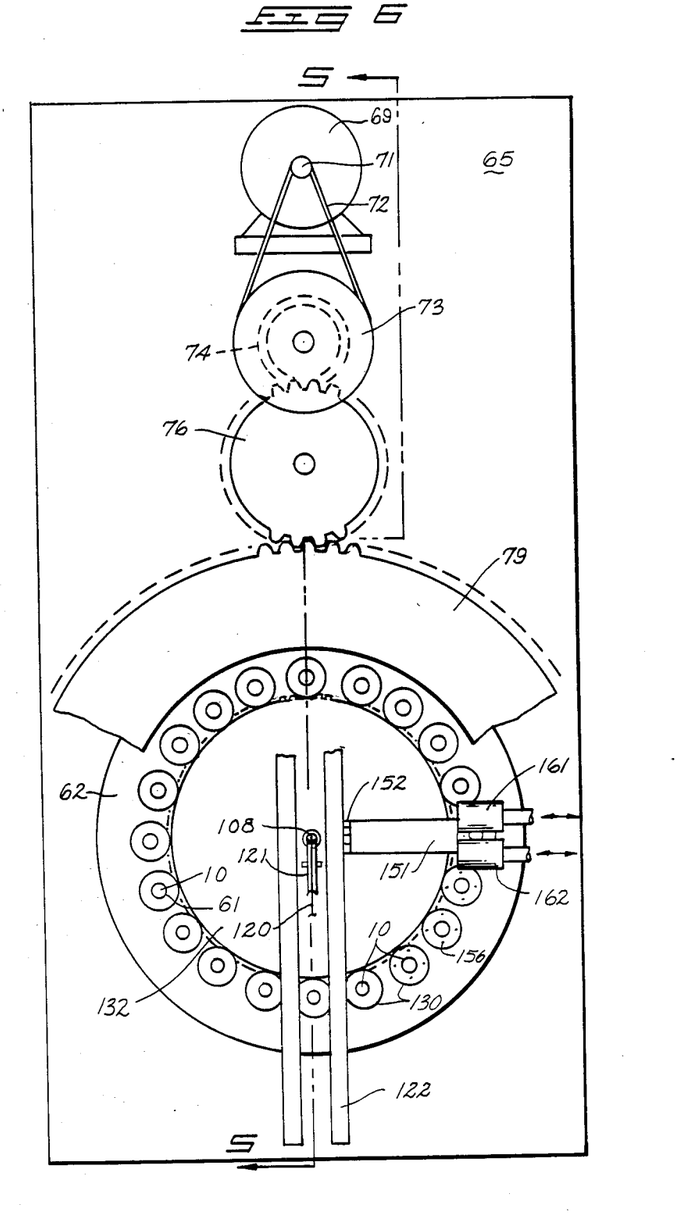
FIG. 6 is a partial end elevational view of the irradiator shown in FIG. 5.

FIGS. 5 and 6 show irradiator 60 in greater structural detail compared to the schematic presentation of FIG. 2. Irradiator 60 has a frame 65 which acts as the basic stationary structural component of the irradiator. Frame 65 also includes a concrete shield 66 which is annularly shaped and surrounds the rotating magazine 62. The rotating magazine 62 is rotatably supported by frame 65 using large ball or roller bearings 67 at each end of the magazine (the bearing is shown at only one end in FIG. 5 to save space).

Irradiator 60 is also preferably provided with a magazine rotation means 68 for rotating the magazine about a longitudinal axis of rotation. Magazine rotation means 68 advantageously comprises a motor 69 which is mounted to frame 65. Motor 69 is provided with a sheave 71 which turns a belt 72 to drive a second sheave 73. Second sheave 73 is mechanically coupled to a gear 74 both of which are rotatably mounted by bearing 75 to frame 65. A second gear 76 is driven by first gear 74. Second gear 76 is mechanically coupled to a third gear 77, both of them being rotatably supported on frame 65 by bearing assembly 78. Third gear 77 meshes with magazine gear 79, which is directly connected to the rotatable magazine 62 by bolts 79a. When motor 69 rotates, it causes rotation of magazine 62 through the network of sheaves, belt and gears just described which provide mechanical leverage and speed reduction so that the magazine turns at a very slow speed such as several revolutions per hour.

Irradiator magazine 62 is provided with a plurality of fuel pin receiving tubes 61 for receiving fuel pins 10 therein. FIG. 6 shows twenty fuel pin receiving tubes 61. The receiving tubes are preferably arranged in a cylindrical arrangement so that each pin is an equal radial distance from the longitudinal axis of the magazine and the source of activating radiation 63 oscillating therealong. Each receiving tube is sufficiently long so that the radioactive fissile material contained within the fuel pin is fully inserted within the irradiator preferably within core 106 (FIG. 5). The receiving tubes can advantageously be provided with thin polyethylene liners (not shown) to reduce friction between the fuel pins and the receiving tubes during insertion, rotation and removal.

The interior of revolving magazine 62 is preferably constructed of a three layer core comprising an inner cylindrical core 104, intermediate cylindrical core 105 and an exterior cylindrical core 106. Inner core 104 is preferably constructed of tungsten. Intermediate core 105 is preferably constructed of beryllium and exterior core 106 is preferably constructed of nickel. Surrounding the cylindrical cores is a layer of concrete 110 which further serves as a barrier to radioactive particles being emitted within the irradiator.

At the longitudinal and rotational axis of the revolving magazine 62 is an activation passageway 107 for receiving a radiation source tube 108. The radiation source tube 108 contains a source of radiation such as californium-252 which is appropriately positioned within the radiation source tube. The axial oscillations of the source of radiation are limited in travel so that oscillating motion of the radiation source tube does not allow high levels of radioactivity to occur outside of magazine 62.

Radiation source tube 108 is oscillated back and forth within the activation passageway 107 by irradiation oscillation means 70 which is most clearly shown in FIG. 1. Irradiator oscillation means 70 preferably includes an oscillatory arm 70a which is connected to the radiation source tube 108 either directly or with a connecting rod. As arm 70a oscillates back and forth, the radiation source tube 108 also oscillates back and forth within activation passageway 107.

To provide for smooth movement of the radiation source tube within activation passageway 107 the irradiator may optionally be provided with a connecting cable 120 which is connected to the opposite end of radiation source tube 108 (see FIG. 5). Cable 120 extends over one or more sheaves 121 connected to a stationary bridge 122 or other frame parts. The end of cable 120 extends around the irradiator 60 guided by the set of sheaves so that it is connected to the irradiator oscillating means arm 70a. Cable means 120 allows radiation source tube 108 to be pulled as it moves in either direction.

Fuel pins 10 are securely retained within fuel pin receiving tubes 61 by a plurality of collets 130 mounted near the end of the receiving tubes. Collets 130 are rotatably mounted on the ends of receiving tubes 61 so that they can rotate the fuel pins repeatedly within receiving tubes 61 about fuel pin longitudinal axes, as the magazine slowly revolves. Collets 130 rotate as a result of engagement of an exterior gear portion 131 formed on each, with a sun gear 132. Sun gear 132 is securely mounted to bridge 122 such as by bolts 133. This rotating collet system comprises a fuel pin rotating means which helps to assure even activation of the fissile material contained within the fuel pins.

Figure 7:
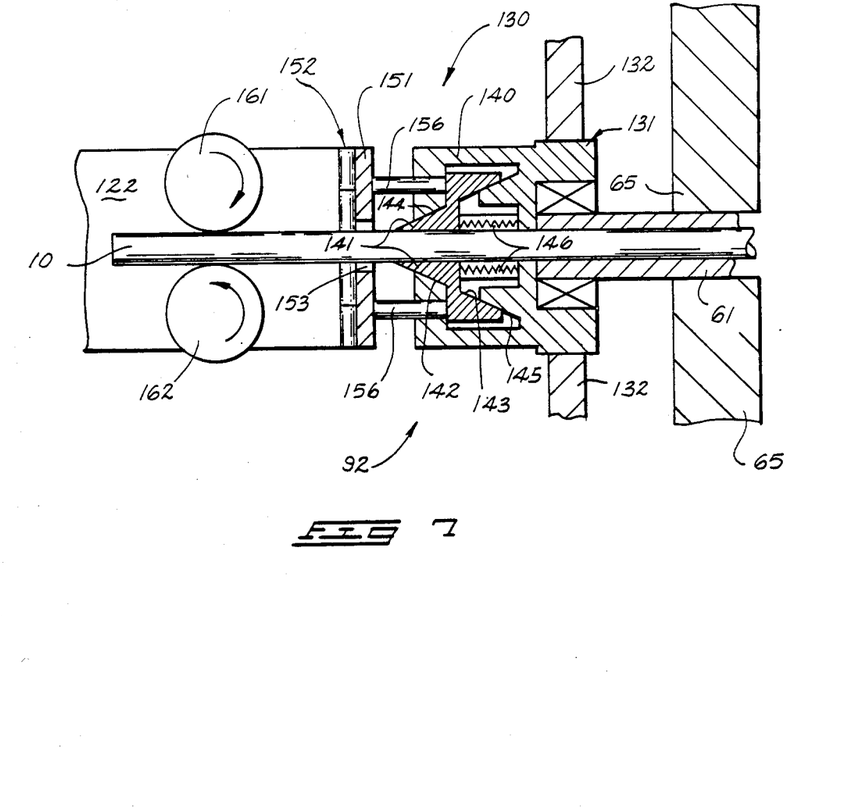
FIG. 7 is an enlarged detail view of the collet system used in the irradiator and other components of the nuclear fuel pin scanner system of FIG. 1.

FIG. 7 shows an enlarged detail view of the collet assemblies 130 used to securely hold and rotate fuel pins 10 within fuel pin receiving tubes 61. The collets include a collet housing 140 which is provided with the exterior geared surface 131 for engaging with the sun gear 132. Within collet housing 140 are four collet jaws 141. Collet jaws 141 have a frontal sloped surface 142 and a rearward sloped surface 143. Frontal sloped surface 142 bears against a collapsing cone 144 and rearward sloped surface 143 bears upon an expanding cone 145. Springs 146 bias the collet jaws 141 forwardly so that they are forced inwardly by collapsing cone 144 to thereby engage and hold the fuel pin 10.

When it is time to release the fuel pin a means for removing fuel pins releases and extracts the fuel pins. Such means includes a hinged arm 151 which swings about hinge 152 connected to bridge piece 122. Arm 151 is provided with an aperture or slot 153 which swings over the end of a fuel pin 10. Arm 151 contacts release pins 156 to force the collet jaws 141 rearwardly against expanding cone 145 to thereby release the collet jaws from the fuel pin.

Pinch rollers 161 and 162 are mounted on a retractable carriage (not shown) which moves into position to engage rollers 161 and 162 with the exterior of the fuel pin 10 and rotate to install or extract pins from the collets and receiving tubes. Another fuel pin can then be inserted into the same receiving tube either at the identical location or at a similar collet releasing station at some other point around the revolving magazine.

Fuel pins held in the irradiator are bombarded by neutrons released by the source of radiation 63. The physics of nuclear fuel made of mixed oxides of plutonium and uranium produces an increased release of gamma rays after the fuel is activated in the irradiator. The increased levels of gamma radiation emmited by the fissile material in the fuel pins is measured over a plurality of small segments of the fuel pin by detector 80.

Figure 8:
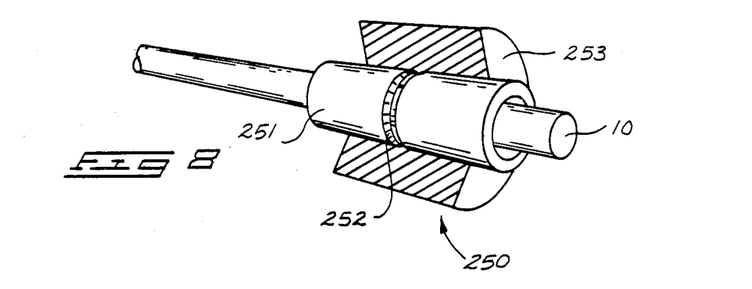
FIG. 8 is a perspective view of a detector element used in a detector included in the nuclear fuel pin scanner system of FIG. 1.
Figure 10:
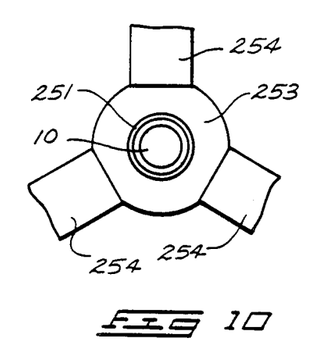
FIG. 10 is an end view of a detector element with associated photomultipliers.

Radiation detector 80 can be of a varity of types with the primary parameter being the ability to discriminate the gamma radiation occurring from a segment of the fuel pins. The segments are usually about 1–2 inches in length, although a variety of segment lengths are possible. FIG. 8 shows a perspective view of a fuel pin 10 passing through a detector element 250. Detector element 250 includes a collimating shield 251 having a slit 252 through which radiation passes outwardly from the fuel pin. A detector crystal 253 surrounds the collimating shield 251 and receives the emitted radiation. The emitted radiation, such as gamma rays, is transformed into infrared or visible light by crystal 253 and is then measured by photomultipliers 254 or other light measurement means (see FIG. 10). Other current or future radiation transducer means may also be acceptable for transforming the radiation into a representative electrical or other type of signal.

Figure 9:
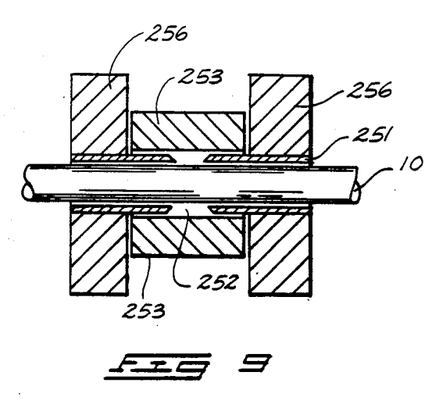
FIG. 9 is a side sectional view of a detector element such as shown in FIG. 8 with the addition of shields at each end.

FIG. 9 shows a side sectional view of a detector element similar to that shown in FIG. 8. The annular detector crystal 253 is preferably made of sodium iodide or bismuth germanate and the collimating shield 251 is preferably made from tungsten. Ring shaped lead shields 256 have been provided at each end to shield the crystal from stray radiation from adjacent detector elements. The collimating shield slit 252 is apprximately ½ inch long and preferably has beveled sides as shown in FIG. 9. Although FIG. 9 shows only one detector element, detector 80 is provided with a linear array of such detector elements, each for inspecting a specified segment of fuel pins 10.

Figure 11:
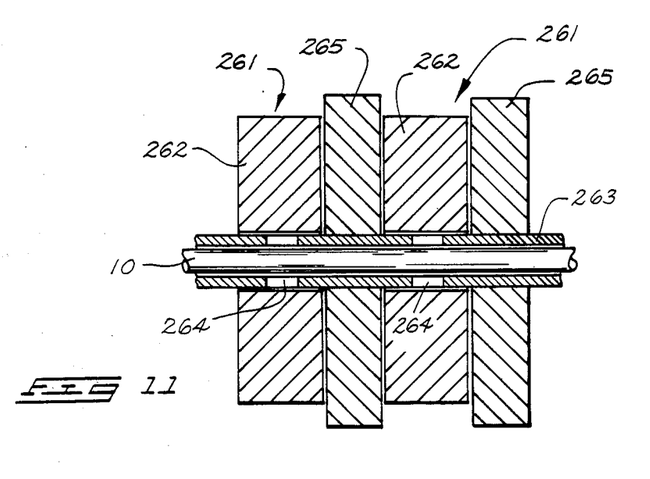
FIG. 11 is a partial side sectional view of a second type of detector which can be used in the scanner system of FIG. 1.

FIG. 11 is a partial view of an alternative type of detector transducer which may be used in conjunction with the single element described above. FIG. 11 shows only two of a variable number of detector elements 261 constructed similarly to the detector element 251. Detector elements 261 have annular sodium iodide or bismuth germanate crystals 262 surrounding a collimating shield 263 preferably made of tungsten. The collimating shield is provided with windows 264 which may be vacant or filled with a radiation transparent material. Lead or other shields 265 separate adjacent detector crystals 262.

The detector elements are arranged in a linear array so that each detector element can be used to inspect only a limited segment of fuel pins 10. This arrangement greatly reduces the distance over which the fuel pins are axially oscillated by oscillator 90. The oscillation distance is approximately equal to the uniform spacing of the detector elements so that the fuel pins are fully inspected without overlap.

Multiple pass detection occurs when the fuel pins are oscillated repeatedly through the relatively short oscillation distance. This configuration and method allows each detector crystal 253 or 262 to gather information during the detection period. Simultaneous detection provides a total effective scanning time equal to a throughput or detection period times the number of segments, thereby multiplying the effective detection time when compared to a single pass detector systems. The multiplied detection time, repeated passes, and segmented inspection increases accuracy while allowing a high throughput rate to be maintained.

Information from each detector element is preferably stored in an on-line computer and correlated with information about position to derive the desired fissile uniformity profile and fuel characterization information. Total fissile loading is produced by integrating the information over the length of the fuel pin.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A nuclear fuel pin scanner system for inspecting nuclear fuel pins at a throughput rate to determine the uniformity and amount of fissile material contained in the fuel pin, comprising:

a rotary irradiator having a source of activating radiation located centrally thereof, said irradiator having a plurality of circumferentially spaced positions thereabout for supporting fuel pins in radially spaced relation to said source of activating radiation;

means for feeding and discharging said fuel pins singly into and from said irradiator at said throughput rate;

means for rotating said irradiator and fuel pins contained therein about the source of activating radiation whereby each fuel pin is irradiated for an extended period of time relative to the throughput rate;

detector means downstream of said irradiator comprising an array of axially spaced radiation detectors for detecting radiation from segments, respectively, of each fuel pin during oscillatory movement of said fuel pin relative to said detector means to achieve an effective total scanning time for said pin equal to a detection period times the number of segments;

fuel pin outfeed means for receiving fuel pins from the detector and for transferring the fuel pins from the system; and wherein the irradiator comprises a cylindrical magazine having a plurality of fuel pin receiving tubes therein for holding fuel pins during activation; the cylindrical magazine being adapted to turn about a longitudinal axis extending therethrough with the fuel pin receiving tubes being arranged in a circular arrangement approximately centered on said longitudinal axis;

the source of activating radiation being positioned at approximately the longitudinal axis of the cylindrical magazine and adapted to be oscillated along said longitudinal axis to provide oscillatory axial relative motion between the fuel pins contained in the magazine and the source of activating radiation.

2. The nuclear fuel pin scanner of claim 1 wherein the irradiator further comprises fuel pin rotation means for rotating fuel pins held within the fuel pin receiving tubes as the cylindrical magazine rotates.

3. The nuclear fuel pin scanner of claim 2 wherein the fuel pins are held within the fuel pin receiving tubes by releasable collets.

4. The nuclear fuel pin scanner of claim 2 wherein the fuel pin rotation means comprises collets which releasably hold the fuel pin; the collets being provided with exterior geared surfaces which engage with a stationary sun gear thereby causing the collets and attached fuel pins to rotate in the receiving tubes as the magazine is rotated.

5. The nuclear fuel pin scanner of claim 1 wherein the source of activating radiation is a supply of neutron emitting radioactive material contained within a radiation source tube; the radiation source tube being oscillated within an activation passageway existing in the irradiator along approximately the longitudinal rotational axis of the cylindrical magazine.

6. The nuclear fuel pin scanner of claim 1 wherein the fuel pin infeed means comprises:
an infeed bank for holding at least one fuel pin to be inspected;
a transfer shuttle for removing fuel pins from the infeed bank;
an infeed conveyor means for receiving fuel pins from the transfer shuttle and for moving the fuel pins to the irradiator.

7. The nuclear fuel pin scanner of claim 1 further comprising:
a background detector, americium gauge and gamma transmission gauge for measuring background radiation, americium radiation levels, and gamma ray transmissiveness, respectively, of fuel pins at a time prior to when the fuel pin enters the irradiator.

8. A nuclear fuel pin irradiator for providing extended irradiation times compared to the throughput rate of the irradiator, comprising:

a frame;
a magazine rotatably mounted upon the frame; the magazine having a longitudinal axis about which it rotates;
a plurality of fuel pin receiving tubes extending longitudinally within the magazine; the fuel pin receiving tubes being arranged in an approximately circular arrangement so that each receiving tube is at approximately an equally spaced radius from the longitudinal axis of the magazine;
means for holding a source of activating radiation centered approximately along the longitudinal axis of the magazine;
means for rotating the magazine; and
means for rotating fuel pins held within the fuel pin receiving tubes as the magazine rotates.

9. The nuclear fuel pin irradiator of claim 8 wherein the magazine is cylindrically shaped.

10. The nuclear fuel pin irradiator of claim 8 further comprising releasable collets for holding fuel pins in the receiving tubes; the collets forming a part of fuel pin rotation means which rotate fuel pins held in the receiving tubes by the collets.

11. The nuclear fuel pin irradiator of claim 8 further comprising means for longitudinally oscillating the source of activating radiation.

12. A method for inspecting nuclear fuel pins to accurately determine uniformity and total amount of fissile material contained therein, comprising:
arranging a plurality of nuclear fuel pins in an arrangement about a longitudinal axis of rotation with each fuel pin approximately an equal radial distance therefrom;
rotating the nuclear fuel pins about said longitudinal axis of rotation;
activating the fuel pins by exposing the fuel pins to a source of activating radiation lying along said longitudinal axis of rotation;
removing activated fuel pins from the arrangement;
positioning an activated fuel pin within a detector means having a plurality of detector elements arranged in an axial array;
oscillating the activated fuel pin positioned within the axial array over a distance approximately equal to the spacing of adjacent detector elements to thereby multiply the effective time available for detection by the number of detector elements; and
detecting the emission of radiation by the activated fuel pin being oscillated within said detector means.

13. The method of claim 12 wherein the source of activating radiation is oscillated longitudinally along the axis of rotation during the step of activating the fuel pins.

14. The method of claim 12 further comprising rotating the individual fuel pins about fuel pin longitudinal axes while the arrangement is rotated and activated.

* * * * *